(12) United States Patent
Martin et al.

(10) Patent No.: US 6,322,085 B1
(45) Date of Patent: *Nov. 27, 2001

(54) LAMINATED TUBULAR STRUCTURE

(75) Inventors: Jon W. Martin, Loudon, TN (US); Xinhua He, West Lafayette, IN (US)

(73) Assignee: TRW Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/602,226

(22) Filed: Jun. 23, 2000

Related U.S. Application Data

(63) Continuation of application No. 08/811,672, filed on Mar. 5, 1997, now Pat. No. 6,234,488.

(51) Int. Cl.[7] .................................................. F16J 15/52
(52) U.S. Cl. ..................... 277/607; 277/627; 277/634; 277/635; 277/650; 277/654; 277/922; 277/923
(58) Field of Search .................................. 277/607, 627, 277/634, 635, 636, 650, 654, 922, 923, 931, 936

(56) References Cited

U.S. PATENT DOCUMENTS

| | | |
|---|---|---|
| 2,027,962 | 1/1936 | Currie . |
| 3,017,302 | 1/1962 | Hultkrans . |
| 3,086,242 | 4/1963 | Cook et al. . |
| 3,591,192 | 7/1971 | Sharp et al. . |
| 3,610,291 | 10/1971 | Heslop et al. . |
| 3,849,864 | 11/1974 | Plummer . |
| 4,003,667 | 1/1977 | Gaines et al. . |
| 4,141,576 | 2/1979 | Lupke et al. . |
| 4,247,584 | 1/1981 | Widiger et al. . |
| 4,274,900 | 6/1981 | Mueller et al. . |
| 4,298,415 | 11/1981 | Nolf . |
| 4,379,009 | 4/1983 | Shibata et al. . |
| 4,558,869 | 12/1985 | Grove et al. . |
| 4,560,178 | 12/1985 | Hempel . |
| 4,578,855 | 4/1986 | Van Der Hagen . |
| 4,627,826 | 12/1986 | Juziuk et al. . |
| 4,639,159 | 1/1987 | Amrath . |
| 4,648,931 | * 3/1987 | Johnston . |
| 4,671,833 | 6/1987 | Bradford et al. . |
| 5,098,752 | 3/1992 | Chang et al. . |
| 5,189,110 | 2/1993 | Ikematu et al. . |
| 5,244,521 | 9/1993 | Ligman . |
| 5,695,202 | 12/1997 | Cartwright et al. . |
| 6,060,137 | * 5/2000 | Akao . |

FOREIGN PATENT DOCUMENTS

| | | |
|---|---|---|
| 2083580 | 5/1994 | (CA) . |
| 3308396 | 9/1984 | (DE) . |
| 3603119 | 8/1987 | (DE) . |
| 8903746 | 5/1989 | (DE) . |
| 2686660 | 7/1993 | (FR) . |
| 57126618 | 8/1982 | (JP) . |

* cited by examiner

*Primary Examiner*—Anthony Knight
*Assistant Examiner*—John L. Beres
(74) *Attorney, Agent, or Firm*—Tarolli, Sundheim, Covell, Tummino & Szabo L.L.P.

(57) ABSTRACT

An apparatus (10) includes a bearing (24) linking first and second vehicle parts (12, 14) for movement relative to each other, and a boot seal (30) protecting the bearing (24). The boot seal (30) is a tube of heat shrinkable thermoplastic material. The tube (30) has a first end portion (34) shrunken against the first vehicle part (12), a second end portion (42) shrunken against the second vehicle part (14), and a flexible intermediate portion (44) which is deflectable between the opposite end portions (34, 40) upon movement of the vehicle parts (12, 14) relative to each other.

21 Claims, 2 Drawing Sheets

LAMINATED TUBULAR STRUCTURE

This application is a continuation of application Ser. No. 08/811,672, filed Mar. 5, 1997, and assigned to the assignee of the present application.

FIELD OF THE INVENTION

The present invention relates to vehicle steering and suspension systems, and particularly relates to a boot seal for sealing a movable joint in a vehicle steering or suspension system.

BACKGROUND OF THE INVENTION

Boot seals are used to protect the bearings in joints between relatively movable parts of vehicle steering and suspension systems. The boot seals are typically formed of molded neoprene rubber and polyurethane. Molded thermoplastic elastomers also are used for making boot seals. The boot seals are molded into the configurations in which they are to be installed, and are snapped into place in an interference fit which is secured by metal clips. Boot seal failures are a common cause of joint failures. This is because water and dirt get in, and/or grease gets out, if the boot seal fails.

SUMMARY OF THE INVENTION

The present invention comprises a boot seal for protecting a bearing between first and second relatively movable vehicle parts, and further comprises a method of installing the boot seal. The boot seal is a heat-shrinkable thermoplastic tube. The tube has a diametrically stretched, unshrunken configuration with a first end portion shrinkable against the first vehicle part, a second end portion shrinkable against the second vehicle part, and a flexible intermediate portion which is deflectable between the opposite end portions.

The boot seal is installed in accordance with the present invention by placing the first end portion of the tube over the first vehicle part, by placing the second end portion of the tube over the second vehicle part, and by heating the end portions of the tube to shrink them against the vehicle parts.

In a preferred embodiment of the invention, the heat shrinkable thermoplastic tube has a laminate structure defined by co-extruded films of heat shrinkable thermoplastic material. At least one of the films is formed of a material that is selected for properties of chemical resistance and toughness. At least one other film is formed of a material which is selected for properties of flexibility.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
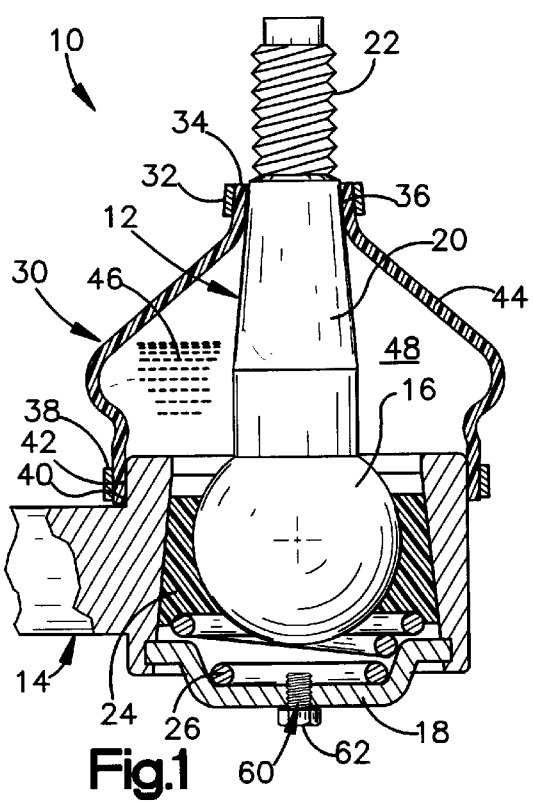
FIG. 1 is a side view, partly in section, of an apparatus comprising a preferred embodiment of the present invention.

An apparatus 10 comprising a preferred embodiment of the present invention is shown in FIG. 1. The apparatus 10 is a ball joint for use in a vehicle, and includes a ball stud 12 and a housing 14. The stud 12 has a ball end 16 located in a socket portion 18 of the housing 14. The stud 12 further has a shank 20 projecting longitudinally from the ball end 16. A screw-threaded end portion 22 of the shank 20 is connectable with a movable part of a vehicle steering or suspension system in a known manner. The housing 14 is connectable with another movable part of the steering or suspension system in a known manner. A bearing 24 and a spring 26 are located in the socket 18, and support the ball end 16 of the stud 12 for limited movement relative to the housing 14.

The ball joint 10 further includes a boot seal 30 which shields the bearing 24, the spring 26, and ball end 16 of the stud 12 from dirt and other foreign substances. An upper clamp 32 holds an upper end portion 34 of the boot seal 30 firmly against a tapered surface portion 36 of the shank 20. A lower clamp 38 similarly holds a lower end portion 40 of the boot seal 30 firmly against an annular outer surface portion 42 of the housing 14. A flexible intermediate portion 44 of the boot seal 30 deflects between the upper and lower end portions 34 and 38 upon movement of the ball stud 12 relative to the housing 14. As shown schematically in FIG. 1, a lubricant 46 for the bearing 24, such as grease or the like, is contained within a space 48 enclosed by the intermediate portion 44 of the boot seal 30.

Figure 2A:
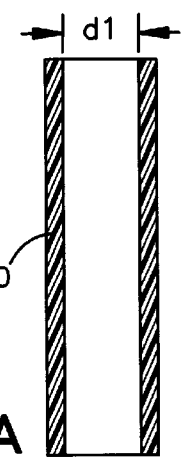
FIG. 2A is a view of a part of the apparatus of FIG. 1 in an initial configuration.
Figure 2B:
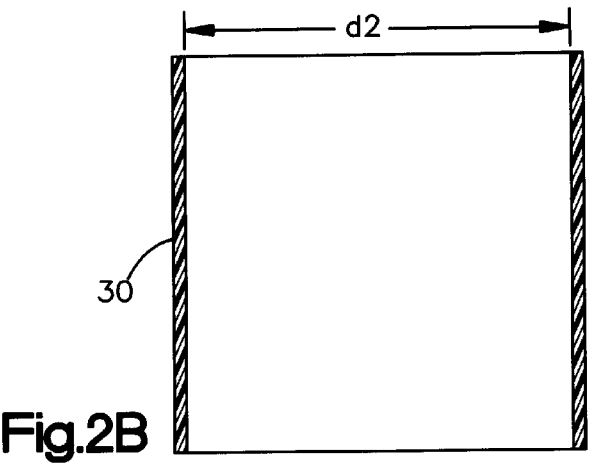
FIG. 2B is a view showing the part of FIG. 2A in an intermediate configuration.

The boot seal 30 is formed of a flexible, heat shrinkable thermoplastic material which may have any suitable composition known in the art. As shown in FIG. 2A, the boot seal 30 initially has a cylindrical configuration with a uniform inner diameter d1. The inner diameter d1 is less than the smallest diameter of the tapered surface portion 36 (FIG. 1) of the shank 20. The boot seal 30 is formed with the initial configuration of FIG. 2A by extruding a tube of the heat-shrinkable plastic material, and by cutting the tube into a plurality of sections, each of which has the length shown in FIG. 2A. The boot seal 30 is subsequently stretched or, if needed, heated and stretched to an enlarged cylindrical configuration having a greater uniform inner diameter d2, as shown in FIG. 2B. The inner diameter d2 is slightly greater than the diameter of the outer surface portion 42 (FIG. 1) of the housing 14.

Figure 3:
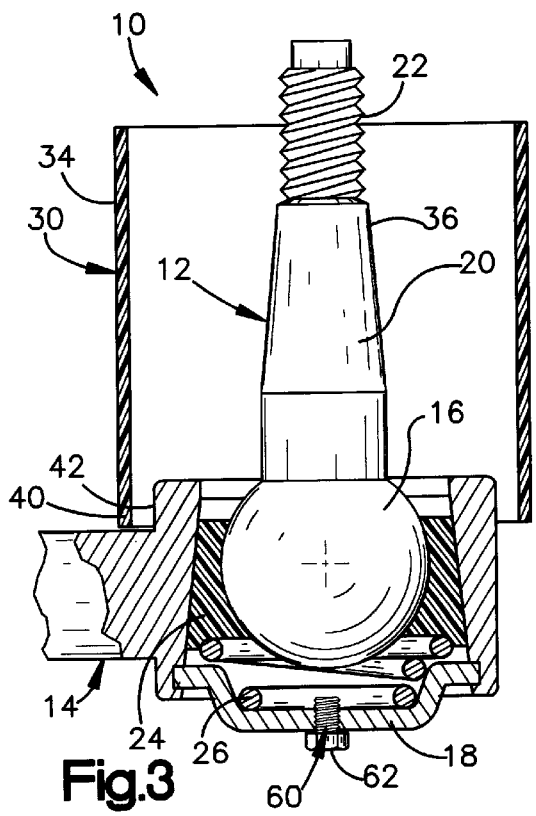
FIGS. 3–5 are views showing steps taken in installation of the part shown in FIG. 2B.
Figure 4:
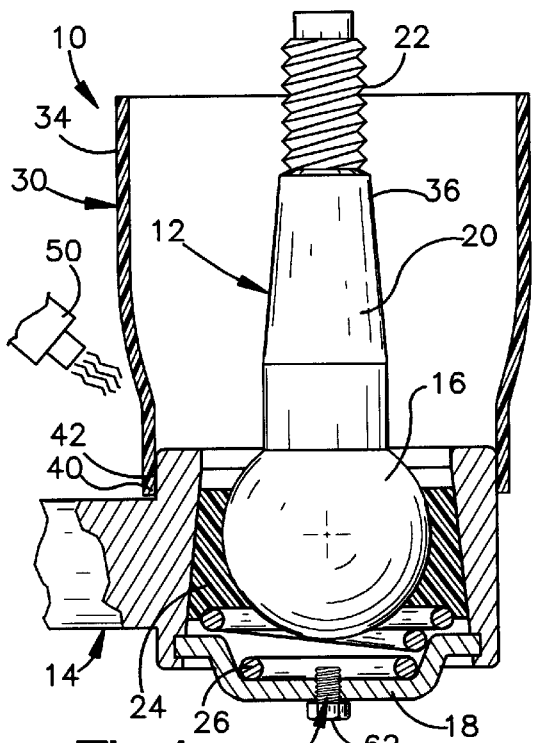
Figure 5:
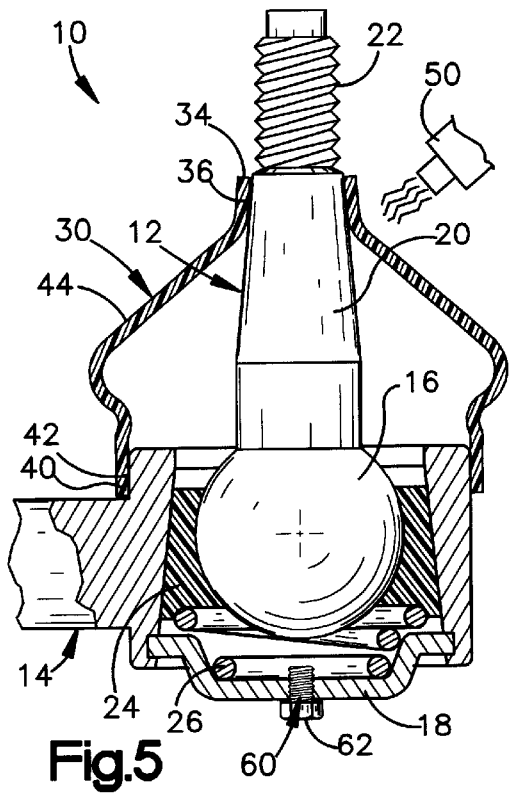

When the boot seal 30 of FIG. 2B is to be installed as shown in FIG. 1, it is first placed over the ball stud 12 and the housing 14 in the position in which it is shown in FIG. 3. As indicated schematically in FIGS. 4 and 5, a source 50 of heat is used to heat and shrink the boot seal 30. The source 50 of heat may comprise any suitable apparatus known in the art such as, for example, a hot air blower. The lower end portion 40 of the boot seal 30 is heated and shrunken radially inward against the outer surface portion 42 of the housing 14. The upper end portion 34 of the boot seal 30 is heated and shrunken radially inward against the tapered surface portion 36 of the shank 20. The intermediate portion 44 of the boot seal 30 is preferably heated and shrunken only adjacent to the opposite end portions 34 and 40. The clamps 32 and 38 are installed on the end portions 34 and 40 of the boot seal 30 in a known manner, as shown in FIG. 1. The ball, joint 10 is then packed with the lubricant 46 by injecting the lubricant 46 through an aperture 60 which is subsequently closed by a plug 62.

Figure 6:
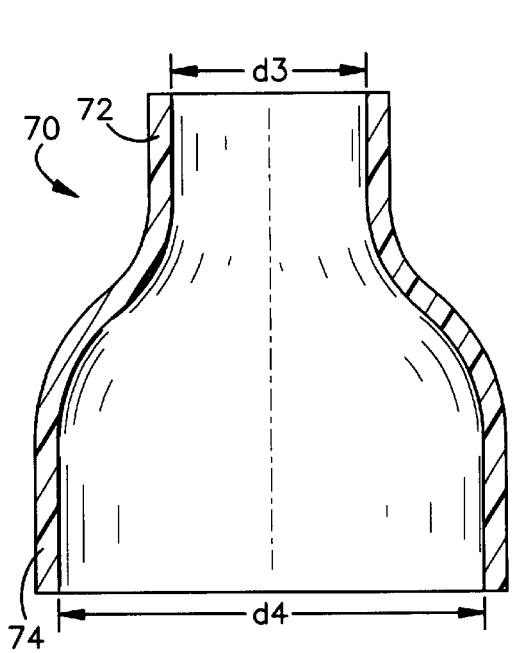
FIG. 6 is a sectional view of a part of an apparatus comprising a second embodiment of the present invention.

FIG. 6 shows an alternative boot seal 70 constructed in accordance with the present invention. Like the boot seal 30 described above, the boot seal 70 is a tubular part formed of flexible, heat-shrinkable thermoplastic material which may have any suitable composition known in the art, and is constructed for installation as a part of a ball joint like the ball joint 10 of FIG. 1. Unlike the boot seal 30, the boot seal 70 has a diametrically stretched, unshrunken configuration with unequal inner diameters d3 and d4 at its upper and lower end portions 72 and 74. The inner diameter d3 is slightly greater than the diameter of the tapered surface portion 36 (FIG. 1) of the shank 20. The inner diameter d4 is slightly greater than the diameter of the outer surface portion 42 (FIG. 1) of the housing 14. The boot seal 70 thus has an unshrunken configuration which more closely approximates the shrunken configuration to be taken when installation is completed.

Figure 7:
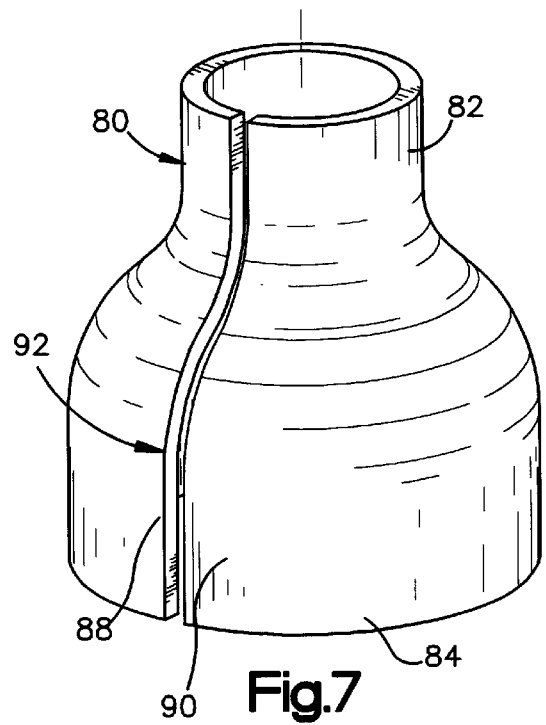
FIG. 7 is an isometric view of a part of an apparatus comprising a third embodiment of the present invention.

Another alternative boot seal 80 constructed in accordance with the present invention is shown in FIG. 7. The boot seal 80 also is a tubular part formed of flexible, heat-shrinkable thermoplastic material, and has upper and lower end portions 82 and 84 that are substantially the same as the corresponding portions of the boot seal 70. However, when the boot seal 80 is in the diametrically stretched, unshrunken condition of FIG. 7, it has a longitudinally split configuration with circumferentially opposite edge portions 88 and 90 defining a gap 92 extending along the entire length of the boot seal 80. The gap 92 can be formed by cutting the boot seal 80 after it has been stretched from its initial extruded configuration. The longitudinally split configuration enables the boot seal 80 to be placed over the stud 12 and the housing 14 after the stud 12 and the housing 14 have been installed in a vehicle. The opposite edge portions 88 and 90 can then be interconnected by the use of an adhesive so as to close the boot seal 80 circumferentially around the stud 12 and the housing 14 before the boot seal 80 is shrunken into place.

Figure 8:
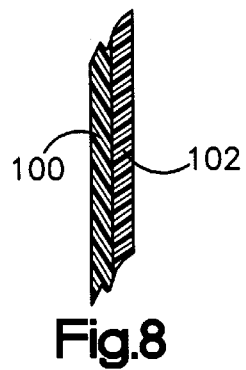
FIG. 8 is a partial sectional view of a part of an apparatus comprising a third embodiment of the present invention.

A heat-shrinkable boot seal constructed in accordance with the present invention most preferably has a laminate structure defined by co-extruded layers of heat-shrinkable thermoplastic material like the thin film layers 100 and 102 shown partially in FIG. 8. The first film layer 100 of FIG. 8 is formed of polyurethane for flexibility, and is preferably 0.02 inch thick. The second film layer 102 of FIG. 8 is formed of polyamide or polyester for toughness and chemical resistance, i.e., resistance to corrosion, and also is preferably 0.02 in. thick. This co-extruded laminate structure has approximately twice the puncture resistance of the conventional, molded boot seal structure formed of the material known as Santoprene (a trademark of Mansanto Industrial Chemicals Co.). Moreover, when this co-extruded laminate structure is stretched at approximately 60° C. to approximately twice its original length, its puncture resistance is doubled again. This results from the crystallization that occurs upon stretching. The present invention thus provides an extruded boot seal structure which is thinner, tougher, and less expensive to manufacture than conventional molded boot seal structures.

Figure 9:
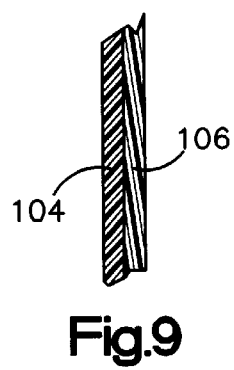
FIG. 9 is a partial sectional view of a part of an apparatus comprising a fourth embodiment of the present invention.
Figure 10:
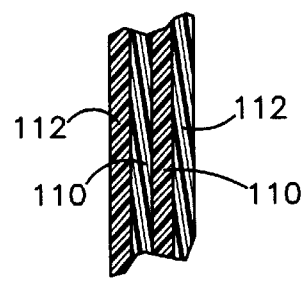
FIG. 10 is a partial sectional view of a part of an apparatus comprising a fifth embodiment of the present invention.

The number, thickness and/or composition of the thin film layers can be varied in accordance with the flexibility, chemical resistance, toughness or other properties to be provided by the laminate structure of the respective boot seal. For example, the alternative laminate structure shown partially in FIG. 9 includes a first layer 104 which is formed of polypropylene for flexibility, and a second layer 106 which is formed of polyester for toughness and resistance to corrosion. Another alternative laminate structure for a boot seal constructed in accordance with the present invention is shown partially in FIG. 10. That structure includes two adjoining inner film layers 110 sandwiched between two outer film layers 112. Each inner film layer 110 is formed of polyurethane for flexibility. Each outer film layer 112 is formed of polyamide for toughness and resistance to corrosion. The outer layers 112 thus shield the inner layers 110 from corrosive substances. The laminate structure of FIG. 10 is preferably formed by joining two of the laminate structures of FIG. 9 in a press.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   a joint including first and second vehicle parts supported for pivotal movement relative to each other; and
   a seal body protecting said joint, said seal body comprising a tube formed of heat-shrinkable thermoplastic material and being in the shape of a tube having a first end portion heat-shrunken against said first vehicle part to grip circumferentially around said first vehicle part to form a seal, said seal body having a second end portion heat-shrunken against said second vehicle part to grip circumferentially around said second vehicle part to form a seal, and said seal body having a flexible intermediate portion which is deflectable between said end portions upon said pivotal movement of said vehicle parts;
   wherein said tube is a lamination of first and second layers bonded together, said first layer being formed of a first material and said second layer being formed of a second material, said first material having a higher degree of flexibility than said second material, said second material being tougher and having a greater resistance to chemicals than said first material.

2. Apparatus as defined in claim 1 wherein said lamination comprises co-extruded layers.

3. Apparatus as defined in claim 2 wherein said first material is polypropylene or polyurethane and said second material is polyester or polyamide.

4. An apparatus comprising:
   a joint comprising first and second vehicle parts supported for pivotal movement relative to each other; and
   a seal protecting said joint, said seal comprising a tube formed of plastic material and having a first end portion received over said first vehicle part, a second end portion received over said second vehicle part, and a flexible intermediate portion which is deflectable between said end portions upon pivotal movement of said vehicle parts relative to each other;
   said tube having a laminate structure defined by co-extruded layers of plastic material;
   wherein said tube includes first and second layers which are bonded together, said first layer being formed of a first material and said second layer being formed of a second material, said first material having a higher degree of flexibility than said second material, said second material being tougher and having a greater resistance to chemicals than said first material.

5. Apparatus as defined in claim 4 which includes at least one layer of polypropylene or polyurethane for flexibility and at least one layer of polyamide or polyester for toughness and chemical resistance.

6. An apparatus comprising:

a joint comprising first and second vehicle parts pivotally movable with respect to each other; and a seal protecting said joint, said seal comprising a tube formed of plastic material and having a first end portion received over said first vehicle part, a second end portion received over said second vehicle part, and a flexible intermediate portion which is deflectable between said end portions upon pivotal movement of said vehicle parts relative to each other;

said tube having a laminate structure defined by co-extruded layers of plastic material;

wherein said tube includes first and second layers which are bonded together, said first layer being formed of a first material and said second layer being formed of a second material, said first material having a higher degree of flexibility than said second material, said second material being tougher and having a greater resistance to chemicals than said first material.

7. Apparatus as defined in claim 6 wherein said layers include at least one layer formed of polypropylene and at least one layer formed of polyester.

8. Apparatus as defined in claim 6 wherein said layers include at least one layer formed of polyamide and at least one layer formed of polyurethane.

9. Apparatus as defined in claim 8 wherein said layers include two adjoining layers formed of polyurethane sandwiched between two layers formed of polyamide.

10. Apparatus as defined in claim 6 wherein said end portions of said tube have unequal inner diameters.

11. Apparatus as defined in claim 6 further comprising first and second clamps respectively clamping said first and second end portions of said tube against said first and second vehicle parts.

12. Apparatus as defined in claim 10 wherein said intermediate portion of said tube encloses a space containing a lubricant for said joint.

13. Apparatus as defined in claim 12 wherein said first vehicle part is a ball stud and said second vehicle part is a housing defining a socket in which said ball stud is supported for pivotal movement relative to said housing.

14. Apparatus as defined in claim 6 wherein said tube includes a third layer which is bonded to one of said first and second layers.

15. An apparatus comprising:

a joint including first and second parts supported for pivotal movement relative to each other; and a seal body protecting said joint, said seal body comprising a tube formed of heat-shrinkable thermoplastic material and being in the shape of a tube having a first end portion heat-shrunken against said first part to grip circumferentially around said first part to form a seal, said seal body having a second end portion heat-shrunken against said second part to grip circumferentially around said second part to form a seal, and said seal body having a flexible intermediate portion which is deflectable between said end portions upon said pivotal movement of said parts;

wherein said tube is a lamination of first and second layers bonded together, said first layer being formed of a first material and said second layer being formed of a second material, said first material having a higher degree of flexibility than said second material, said second material being tougher and having a greater resistance to chemicals than said first material.

16. The apparatus of claim 15 wherein said lamination comprises co-extruded layers.

17. The apparatus of claim 16 wherein said second material is polyester or polyamide and said first material is polypropylene or polyurethane.

18. An apparatus comprising:

a tube formed of plastic material and having a first end portion, a second end portion, and a flexible intermediate portion which is deflectable between said end portions;

said tube having a laminate structure defined by co-extruded layers of plastic material;

wherein said tube includes first and second layers which are bonded together, said first layer being formed of a first material and said second layer being formed of a second material, said first material having a higher degree of flexibility than said second material, said second material being tougher and having a greater resistance to chemicals than said first material.

19. The apparatus of claim 18 wherein said second material is polyester or polyamide and said first material is polypropylene or polyurethane.

20. An apparatus comprising:

first and second parts movable relative to each other; and a tube formed of plastic material and having a first end portion received over said first part, a second end portion received over said second part, and a flexible intermediate portion which is more flexible than said end portions and is deflectable between said end portions upon movement of said parts relative to each other;

said tube having a laminate structure defined by co-extruded layers of plastic material;

wherein said tube includes first and second layers which are bonded together, said first layer being formed of a first material and said second layer being formed of a second material, said first material having a higher degree of flexibility than said second material, said second material being tougher and having a greater resistance to chemicals than said first material.

21. The apparatus of claim 20 wherein one of said layers is polypropylene or polyurethane and the other of said layers is polyester or polyamide.

* * * * *